United States Patent
Kriese et al.

(10) Patent No.: US 9,821,636 B2
(45) Date of Patent: *Nov. 21, 2017

(54) GUIDE RAIL FOR A WINDOW LIFT AND DOOR SYSTEM FOR A VEHICLE DOOR

(71) Applicant: BROSE FAHRZEUGTEILE GMBH & CO. KG, HALLSTADT, Hallstadt (DE)

(72) Inventors: Olaf Kriese, Coburg (DE); Martin Schlechtriemen, Staffelbach (DE); Volker Wilhelmi gen. Hofmann, Grossheirath (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 30 days.

This patent is subject to a terminal disclaimer.

(21) Appl. No.: 14/754,290

(22) Filed: Jun. 29, 2015

(65) Prior Publication Data
US 2015/0352927 A1 Dec. 10, 2015

Related U.S. Application Data

(62) Division of application No. 13/807,916, filed as application No. PCT/EP2011/060437 on Jun. 22, 2011, now Pat. No. 9,103,151.

(30) Foreign Application Priority Data

Jul. 6, 2010 (DE) .................. 10 2010 031 015

(51) Int. Cl.
E05F 11/48 (2006.01)
B60J 1/17 (2006.01)
(Continued)

(52) U.S. Cl.
CPC ............. B60J 1/17 (2013.01); B29C 45/14 (2013.01); B60J 1/007 (2013.01); E05D 15/165 (2013.01);
(Continued)

(58) Field of Classification Search
CPC ...... E05F 11/481; E05F 11/488; E05D 15/165
(Continued)

(56) References Cited

U.S. PATENT DOCUMENTS 3,466,803 A * 9/1969 Packett ................. E05F 11/382
16/93 R
5,159,781 A * 11/1992 Glossop, Jr. ............... B60J 1/17
49/375

(Continued)

FOREIGN PATENT DOCUMENTS

CN 1469026 A 1/2004
DE 195 04 781 C1 8/1996
(Continued)

OTHER PUBLICATIONS

English translation of Chinese Office action for Application No. 201180033301.9 dated May 23, 2014, 11 sheets.
(Continued)

*Primary Examiner* — Jerry Redman
(74) *Attorney, Agent, or Firm* — Lewis Roca Rothgerber Christie LLP

(57) ABSTRACT

A guide rail for a window lifter for raising and lowering a window pane or door system for a vehicle door having a carrier and at least two guide rails disposed on the carrier. The guide rails include a guide profile that can be twisted or bent for guiding an adjusting part of the window lifter coupled to the window pane along an adjusting direction predetermined by the guide rails and the guide profile includes a base and two legs protruding at obtuse draft (Continued)

angles from the ends of the base, such that the size of the draft angles is proportional to the bending or twisting of the guide rails prescribed by the kinematics of the retraction of the window pane over the adjusting travel of the window pane.

8 Claims, 10 Drawing Sheets

(51) Int. Cl.
    *B60J 1/00*           (2006.01)
    *E05F 11/38*         (2006.01)
    *E05F 11/44*         (2006.01)
    *B29C 45/14*         (2006.01)
    *E05D 15/16*         (2006.01)
    *E06B 3/44*          (2006.01)
    *B29K 101/00*       (2006.01)
    *B29L 31/00*        (2006.01)

(52) U.S. Cl.
    CPC .......... *E05F 11/385* (2013.01); *E05F 11/445* (2013.01); *E05F 11/481* (2013.01); *E05F 11/483* (2013.01); *E05F 11/488* (2013.01); *E06B 3/44* (2013.01); *B29K 2101/00* (2013.01); *B29L 2031/7502* (2013.01); *E05Y 2201/684* (2013.01); *E05Y 2800/266* (2013.01); *E05Y 2900/55* (2013.01)

(58) Field of Classification Search
    USPC .................................. 49/348, 349, 352, 502
    See application file for complete search history.

(56) References Cited

U.S. PATENT DOCUMENTS

| | | | |
|---|---|---|---|
| 5,673,515 A * | 10/1997 | Weber ................... | E05F 11/385 |
| | | | 49/140 |
| 5,799,441 A * | 9/1998 | Shibata ................. | E05F 11/481 |
| | | | 49/352 |
| 5,946,860 A | 9/1999 | Weber et al. | |
| 6,088,965 A * | 7/2000 | Fukumoto ............. | E05F 11/486 |
| | | | 49/352 |
| 6,152,519 A | 11/2000 | Blank et al. | |
| 6,874,279 B1 * | 4/2005 | Weber ................... | B60J 5/0416 |
| | | | 49/348 |
| 7,121,044 B2 | 10/2006 | Santaolalla Gil et al. | |
| 7,490,438 B1 | 2/2009 | Maass et al. | |
| 9,103,151 B2 * | 8/2015 | Kriese .................. | E05F 11/481 |
| 2004/0074149 A1 | 4/2004 | Tatsumi et al. | |
| 2004/0163320 A1* | 8/2004 | Kirejczyk ............. | E05F 11/483 |
| | | | 49/352 |
| 2007/0220811 A1 | 9/2007 | Flendrig et al. | |
| 2008/0086949 A1 | 4/2008 | Shimura et al. | |
| 2010/0132261 A1 | 6/2010 | Krüger et al. | |
| 2013/0097932 A1 | 4/2013 | Kriese et al. | |

FOREIGN PATENT DOCUMENTS

| | | |
|---|---|---|
| DE | 198 06 762 A1 | 8/1999 |
| DE | 199 42 643 A1 | 3/2001 |
| DE | 10 2005 040 321 A1 | 3/2007 |
| DE | 602 20 548 T2 | 2/2008 |
| DE | 10 2007 016 953 A1 | 10/2008 |
| EP | 0 704 595 A1 | 4/1996 |
| JP | 64-12884 | 1/1989 |
| JP | 11-500796 | 1/1999 |
| JP | 2007-198056 A | 8/2007 |

OTHER PUBLICATIONS

Korean Office action for Application No. 10-2013-7000831, dated Jan. 27, 2015, and English translation, 9 sheets.

English translation of Japanese Office action for Application No. 2013-517190, dated May 13, 2014, 2 sheets.

English translation of the International Preliminary Report on Patentability for International Application No. PCT/EP2011/060437, dated Jan. 8, 2013, 8 sheets.

* cited by examiner (A-A)

(B-B)

(C-C)

$\gamma \geq \alpha + \beta$ (A-A)

(B-B)

(C-C)

$$\gamma \geq \alpha + \beta - \delta/2$$

(B - B)

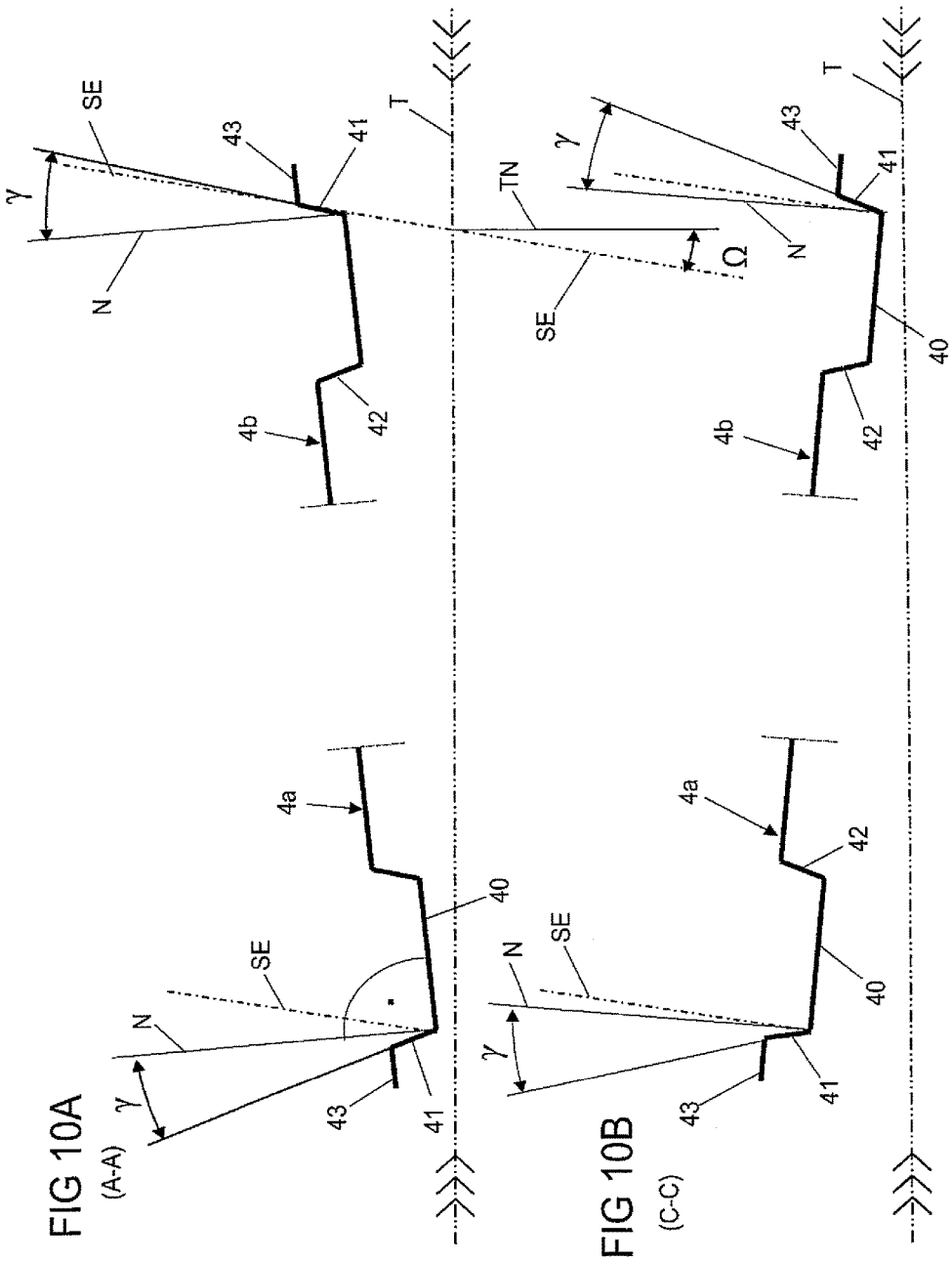

GUIDE RAIL FOR A WINDOW LIFT AND DOOR SYSTEM FOR A VEHICLE DOOR

CROSS-REFERENCE TO A RELATED APPLICATION(S)

This application is a divisional application of U.S. patent application Ser. No. 13/807,916, filed Dec. 31, 2012, now U.S. Pat. No. 9,103,151, which is a National Phase Patent Application of International Patent Application Number PCT/EP2011/060437, filed on Jun. 22, 2011, which claims priority of German Patent Application Number 10 2010 031 015.8, filed on Jul. 6, 2010. The entire contents of all of which are hereby expressly incorporated by reference.

BACKGROUND

The invention relates to a guide rail for a window lifter and a door system for a vehicle door.

Door systems or door modules use an aggregate carrier, on which functional components, for instance a window lifter unit, a loudspeaker, a side airbag, a door lock arrangement or such are arranged or a base plate for a window lifter unit for providing a pre-assembled, pre-testable unit, which can be assembled in a simple manner on a vehicle door. The base plate or the aggregate carrier as components of a window lifter unit carry thereby at least one guide rail, along which a carrier connected to a window pane is guided.

Such door system or door modules are used in different modifications in different vehicles and vehicle types of a vehicle manufacturer, wherein each variant of a vehicle type requires a specific individual construction of the door system or window lifter, since the vehicle doors of the different variants and vehicle types are designed differently and differ in their constructive design and style. For instance, for different vehicle doors window panes with different kinematics, that means different radius of curvature, different retracting angles (which indicate, if a window pane is driven into a vehicle door almost vertical or diagonal) and different adjustment paths including rotations about single or multiple vehicle axis (X, Y and Z-axis) are used and require a specific adaptation of the guiderails or the guiding sections formed on an aggregate carrier. For this purpose, the guiderails or guiderails integrated in an aggregate carrier or a base plate (in the following named "carrier") and formed as guide sections are bent in longitudinal direction and/or twisted about their longitudinal axis such that they are bent after assembling into a vehicle door for instance about the vehicle longitudinal axis (X-axis) and/or are twisted about the vehicle vertical axis (Z-axis).

The bent and/or twisted guide rails with a guide profile of a base and two profile legs protruding vertically from the base are in general roll-profiled, punched-printed or made in an injection moulding, wherein for producing a twisted guide rail for a retraction of the window pane corresponding to the twist in the injection molding an injection molding tool is required which contains a separated form, which is opened or closed for injecting plastic and removing the guide rail (so called "on-off tool"), and at least one slider moved vertically or in an angle to the opening and closing direction of the separated form for realizing the indentations required by the twists. The use of sliders however makes a tool complex and thus expensive and extends the production process due to the required movement of the slider before the opening or after the closing of the form.

SUMMARY

Object of the present invention is to provide a guide profile for a twisted guide rail and/or a door system with a twisted or twistable carrier with guide sections, which allows for a simple and cost efficient production of a guide rail, a carrier or the carrier section of a carrier.

The solution according to the invention allows a simple and cost efficient production of a guide profile for a twisted guide rail and/or a door system with a twisted or twistable carrier or a carrier with guide sections, such that due to the guide profile according to the invention a simple on-off tool without slider can be used for producing the guide rail or the carrier of a door system.

According to an exemplary embodiment of the invention the twisted or bent guide profile of a guide rail comprises a base and two legs for guiding an adjusting part of the window lifter, which can be coupled to the window pane, along an adjusting direction predetermined by the guide rail, wherein the legs protrude from the ends of the base at obtuse draft angles such that the size of the draft angles is proportional to the bending or twisting of the guide rail predetermined by the kinematics of the retraction of the window pane over the adjusting travel path (hub) of the window pane.

This allows the demolding of a twisted guide rail without the use of a slider in the tool and thus a simple and cost efficient production of a guide profile for a twisted guide rail is guaranteed.

The profile angle with which the legs protrude from the ends of the base of the guide profile in respect to the base normal is preferably determined with the requirement $$\gamma \geq \alpha + \beta$$

wherein $\alpha$ and $\beta$ are the twisting angles of the guide rail in respect to both ends of the guide rail.

In a door system for a vehicle door with a carrier and at least two guide rails of a window lifter integrated into the carrier for lifting and lowering a window pane, wherein the guide rails have a guide profile for guiding an adjusting part of the window lifter, which can be coupled to the window pane, along an adjusting direction predetermined by the guide rails the carrier contains at least one guide rail that can be at least sectionally twisted or bent and the guide profile of the guide rail comprises a base and two legs, which protrude from the ends of the base at obtuse draft angles, wherein the size of the draft angles is proportional to the bending or twisting of the carrier predetermined by the kinematics of the retraction of the window pane or the guide rail or the guide rails over the travel path thereof.

When using a guide rail also in this manner the size of the draft angle is proportional to the bending or twisting of the carrier predetermined by the kinematics of the retraction of the window pane or the guide rail or guide rails via the travel path thereof.

In case of guide rails aligned parallel to each other and integrated into a carrier the legs protrude from the ends of the base of the guide profile at a profile angle in respect to the base normal which meets the requirement $$\gamma \geq \alpha + \beta$$

wherein $\alpha$ and $\beta$ are the twisting angles of the guide rail in respect to both ends of the guide rail.

In case of guide rails aligned to the window pane area and integrated into a base plate, the legs protrude from the ends of the base with a profile angle in respect to the base normal, which meets the requirement $$\gamma \geq \alpha + \beta - \delta/2$$

wherein $\alpha$ and $\beta$ are the twisting angles of the guide rails in respect to both ends of the guide rail and $\delta$ is the angle between the bases of the two guide rails.

If additional recesses for receiving components of the window lifter—as for instance a rope drum—are moulded into the carrier when their alignment, that means their angle position in respect to the tool parting plane or the plane of the carrier, is to be considered in order to be able to use a simple, slider-free on-off tool since the retraction or demoulding direction of the tool deviating from the vertical can also effect the profile angles of the guide rails.

Accordingly, in a door system with a recess for receiving a component of the window lifter, in particular for receiving a rope drum, moulded into the carrier wherein the side walls of the recess are inclined with an inclination angle $\Omega$ to the normal of the tool parting plane of a tool, and guide rails arranged parallel to each other, the guide legs of the guide rails are inclined with a profile angle $\gamma$ in respect to the base normal N, which meets the requirement $$\gamma \geq \alpha + \beta \pm \Omega$$

wherein $\alpha$ and $\beta$ are the twisting angles of the guide rails in respect to both ends of the guide rails.

In a door system with a recess for receiving a component of the window lifter, in particular for receiving a rope drum, moulded into the carrier, wherein the side walls of the recess are inclined with an inclination angle $\Omega$ to the normal of the tool parting plane of a tool, and guide rails aligned to the pane area of a window pane the guide legs of the guide rails are inclined with a profile angle $\gamma$ in respect to the base normal N, which meets the requirement $$\gamma \geq \alpha + \beta - \delta/2 \pm \Omega$$

wherein $\alpha$ and $\beta$ are the twisting angles of the guide rails in respect to both ends of the guide rails and $\delta$ is the angle between the bases of both guide rails.

By considering the inclination angle $\Omega$, when defining the criteria for determining the minimal profile angle $\gamma$ at which the guide legs have to be inclined in respect to the base normal N in order to demould the carrier with a simple off-on tool, the demoulding can thus occur in a retraction direction deviating from the vertical to the tool parting plane.

By maintaining the requirement to use a simple on-off tool when producing a carrier with integrated guide rails with bends and/or twists the profile angles of the guide rails of the right and left guide rail in a double rail system can be different from each other, that means can be adapted with different degrees to the inclination of the recess for receiving a component of the window lifter.

In the same manner, the profile angles of the guide legs and/or the legs of the right and left guide rail can be different from each other in case of guide rails arranged parallel to each other as well as in case of guide rails aligned to the pane area of a window pane.

By forming different angles at the guide legs of the right and left guide rail different guide properties of the guide rails can simultaneously be considered, that means for instance an improvement of the guide properties of one of the two guide rails in vehicle longitudinal direction or in direction of the X-axis, in which the corresponding profile angle is minimal dimensioned and is in particular set to zero, that means is aligned parallel to the inclination of the side walls of the recess in respect to the normal of the tool parting plane.

A method for producing a twisted guide rail is characterized in that a separated form of a injection moulding tool corresponding to the guide profile of the guide rail is closed under pressure for injecting plastic and is opened for demoulding of the guide rail without that a slider is guided vertical or in an angle for opening or closing direction of the injection moulding tool (on-off tool).

A method for producing a carrier and two guide rails of the window lifter arranged on the carrier is characterized in that a separated form of a injection moulding tool corresponding to the carrier and the guide profile of the guide rails is closed under pressure for injecting plastic and is opened for demoulding of the carrier and the guide rails without that a slider is guided vertical or in an angle to the opening-closing direction of the injection moulding tool (on-off tool).

BRIEF DESCRIPTION OF THE DRAWINGS

The invention is explained in the following by the means of multiple embodiments illustrated in the Figures of the Drawings in more detail.

FIGS. 10A and 10B shows a schematic illustration of the guide profile of right and left guide rails arranged parallel to each other with a recess moulded into the carrier according to FIG. 9 required for the production with a slider-free tool.

DETAILED DESCRIPTION

Figure 1:
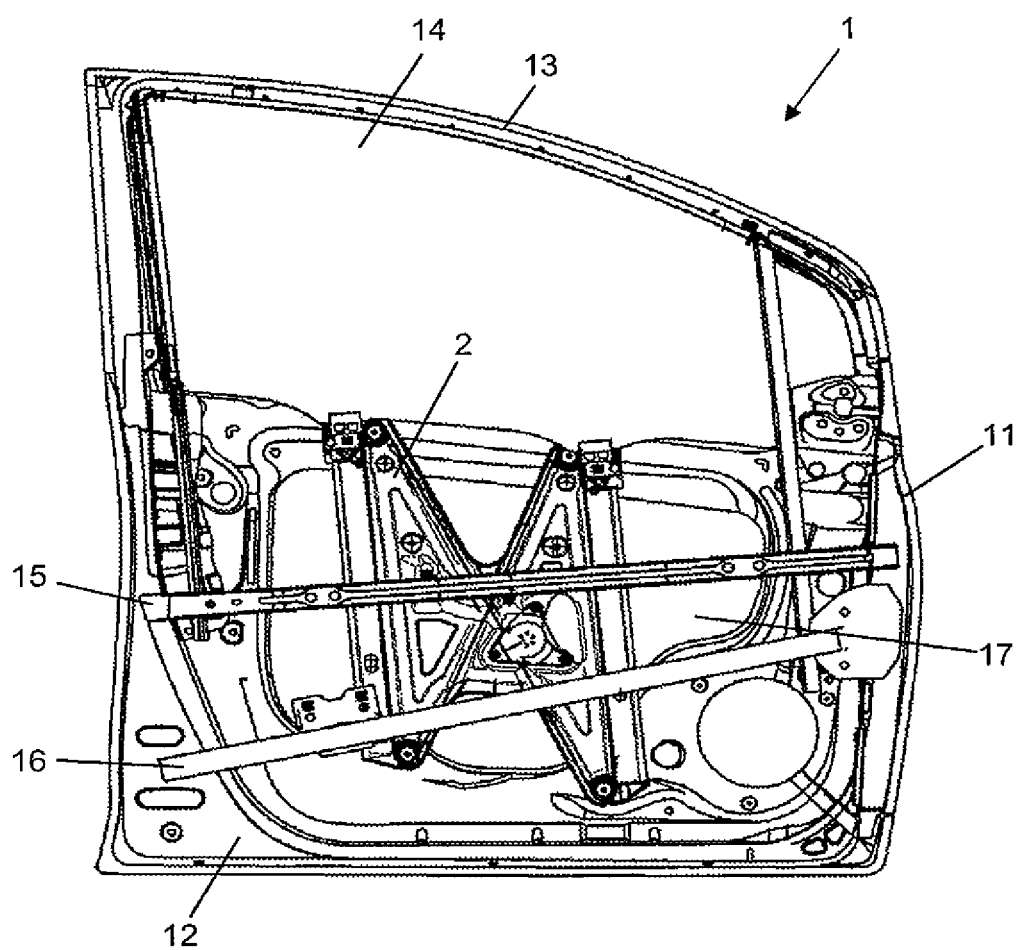
FIG. 1 shows a view of a vehicle door with a carrier of a door system arranged thereon with a window lifter and two guide rails integrated into the carrier.

FIG. 1 shows a view of the internal side of the vehicle door 1 facing the vehicle interior, which comprises a door outer panel 11 and a door inner panel 12 as well as an upper door frame 13, which surrounds a window opening 14. In the door body formed by the door outer panel 11 and the door inner panel 12 two impact beams or crash barriers 15, 16 are arranged, which pick up and absorb the crash forces resulting from a side impact on the vehicle door 1.

A carrier 2 (base plate or aggregate carrier) for receiving functional components of the vehicle door 1 such as a window lifter, a door lock arrangement, a side airbag or such is arranged in the opening 17 of the door inner panel 12 and is made of metal or plastic.

Figure 2:
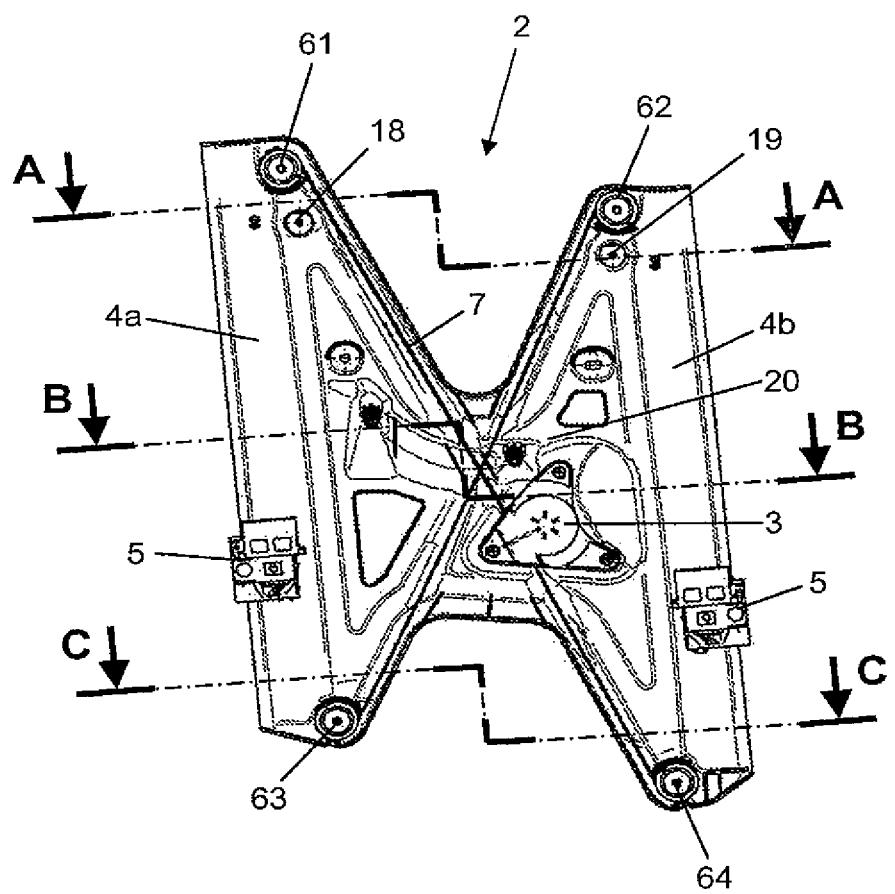
FIG. 2 shows an isolated view of the carrier with two integrated guide rails according to FIG. 1 with three intersecting lines mapped therein.

FIG. 2 shows in an isolated view the carrier 2 with components of a double stranded window lifter arranged thereon, namely a driving unit 3 with a rope drum for driving a window lifter rope 7, which is guided via rope pulleys or guide pulleys 61 to 64 and is connected to two drivers 5 arranged and guided on guide rails 4a, 4b. The drivers 5 coupled to a window pane are raised or lowered depending on the driving direction of the driving unit 3 on the guide rails 4a, 4b, whereby the window pane opens or closes the window opening 14 of the door frame 13.

The carrier 2 is connected via upper fastening points 18, 19 and via the lower guide pulleys 63, 64, which simultaneously represent fastening points, to the door inner panel 12 according to FIG. 1 by inserting fastening bolts through the fastening points 81, 82 or the fastening points on the lower guide pulleys 63, 64 and are engaged to the door inner panel 12.

The guide rails 4a, 4b for guiding the driver 5 are formed in one piece to the carrier 2 in the embodiment of the carrier 2 illustrated in FIG. 2 can however also be alternatively produced separately and can be connected in a suitable manner to the carrier 2.

Depending on the vehicles of different vehicle manufacturers, on the vehicle type and the design of a vehicle door the window pane of a window lifter to be adjusted can be formed differently. For instance a window pane can comprise depending on the design of a vehicle door a specific curvature radius, which can be different in different vehicle doors and determines a moving path along which the window pane is driven in or out of the door body formed by the door outer panel 11 and door inner panel 12 for adjustment. Furthermore, the movement path of the window panes can be formed differently and can for instance be driven in or out of the door body almost vertical or diagonal, or for bypassing obstacles in the door body or for concise fit of a bent barrel-shaped window pane on the door insulation, can be pivoted about the vehicle longitudinal axis (X-axis), vehicle lateral axis (Y-axis) or vehicle vertical axis (Z-axis) or about planes formed by the three axes such that due to these specifications the guide rails determining the movement path of the window panes have to be bent or twisted in their longitudinal extension accordingly.

The same is valid for guide rails connected in one piece to the carrier, which have to comprise bends and/or twists for realizing predetermined movement paths when adjusting a window pane.

When producing guide rails or carriers for door systems of vehicle doors injection molding techniques are used due to their high accuracy and simple manufacturing at high quantities, in which metal or plastic is injected in liquid form under pressure into a mould separated by a tool parting plane in the closed position thereof and the work piece is removed from the opened mould in form of a guide rail or a carrier. Thereby, it is desired to use only one mould due to short cycle times and manufacturing of simple cost efficient tools, wherein said mould is closed for injecting the material and is opened for removing the work piece (so called "on-off tool") without that one or more sliders are used, which are moved vertically or in an angle to the opening and closing direction of the tool or the mould in order to produce indentations, cavities or such in the tool, which occur in case of twists.

The demoulding of twisted guide rails or twisted guide sections on carriers with a profile angle of 90° is possible due to the indentations occurring thereby but only by using sliders in the tool. In order to avoid this necessary use of sliders in the tool guide rails are suggested the guide profile thereof is designed according to the invention such that the legs protrude in an obtuse angle from the base of the guide rail.

The degree of the inclination of the legs in respect to the base of the guide rail, that means the profile angle $\gamma$, depends essentially on whether it is a singular guide rail or when using two guide rails if those are arranged parallel to each other or aligned to the pane area of the window pane. The embodiments described in the following by the means of FIGS. 3 to 8 relate to the determination of the profile angle $\gamma$ with guide rails arranged parallel to each other or aligned to the pane surface, wherein the same conditions are valid for a singular guide rail as well as for guide rails arranged parallel to each other.

Figure 3:
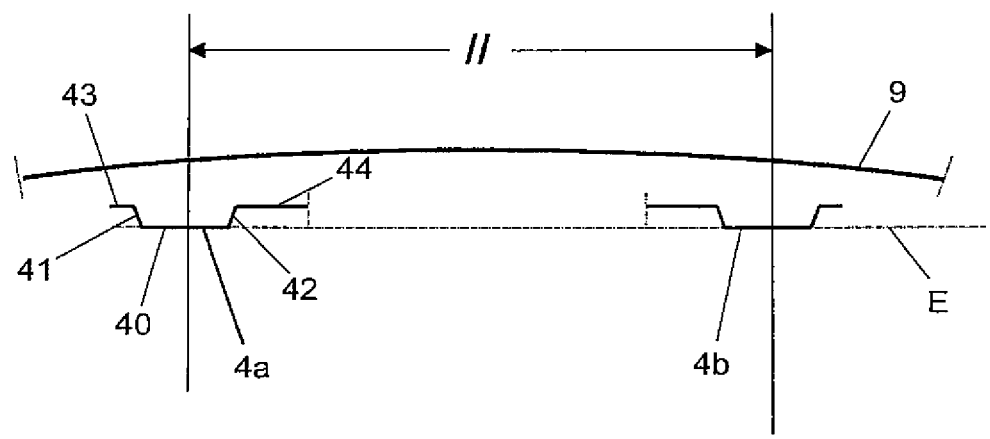
FIG. 3 shows a schematic illustration of two guide rails arranged parallel to each other and an arched window pane.

FIG. 3 shows a schematic cross section of a bent window pane 9 and two guide rails 4a, 4b arranged parallel to each other in a plane, wherein said guide rails are arranged on the side edges of a central body 20 of a carrier 2 according to FIG. 2. The guide rails 4a, 4b have a base 40 wherein a guide leg 41 and a leg 42 protrude at an obtuse angle in respect to the base 40 from the ends of said base. A sliding bar 43 protrudes from the end of the guide leg 41 and a bar 44 protrudes from the end of the leg 42, which are aligned parallel to the base 40. The driver 5 encompasses according to FIG. 2 the guide leg 41, the sliding bar 43 and the base 40, while the leg 41 and the 44 are free.

Figure 4A:
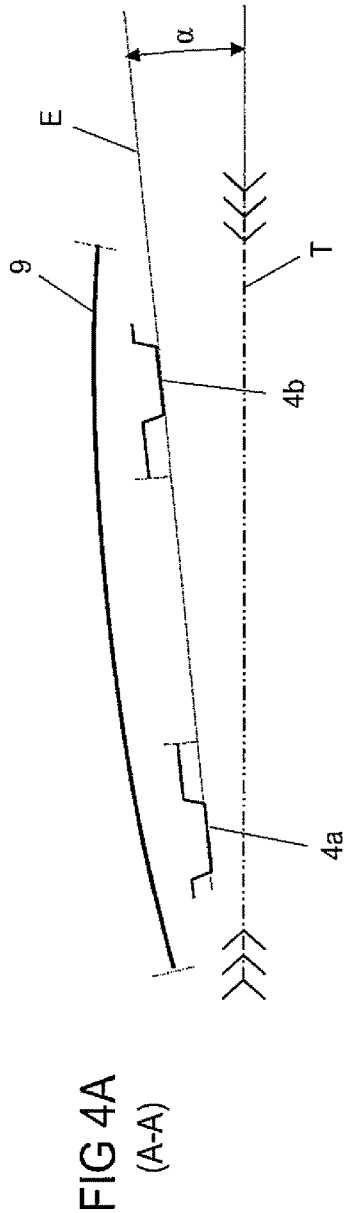
FIG. 4a shows a schematic section of the carrier according to FIG. 2 along the intersecting line A-A with guide rails arranged parallel to each other.
Figure 4B:
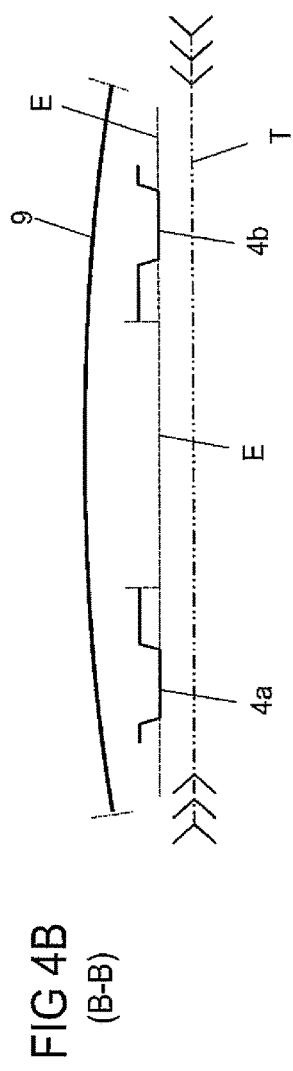
FIG. 4b shows a schematic section of the carrier according to FIG. 2 along the intersecting line B-B with guide rails arranged parallel to each other.
Figure 4C:
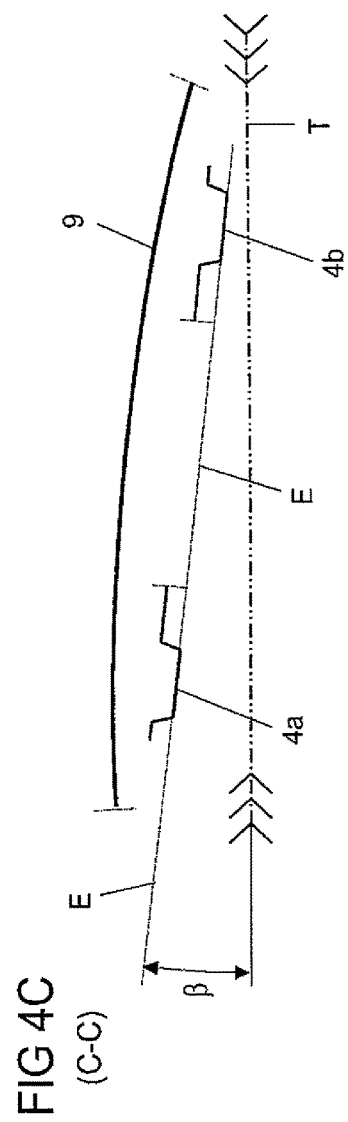
FIG. 4c shows a schematic section of the carrier according to FIG. 2 along the intersecting line C-C with guide rails arranged parallel to each other.

For clarifying the twisting of the guide rails 4a, 4b arranged in a plane E sections of the carrier 2 according to FIG. 2 along the intersecting lines A-A, B-B and C-C are illustrated in FIGS. 4a to 4C, which show on the one hand that the guide rails 4a, 4b are arranged in a plane E but which are twisted along their longitudinal extension (and when installed into the vehicle door about the vehicle vertical axis or Z-axis). The tool parting plane T is illustrated in the FIGS. 4a to 4c for characterizing the degree of twisting wherein said tool parting plane T corresponds to the separation or tool parting plane of a separated mould as tool.

According to FIG. 4a the common plane E of the guide rails 4a, 4b arranged parallel to each other enclose a twisting angle $\alpha$ with the tool parting plane T, while according to FIG. 4b the common plane E of the guide rails 4 arranged parallel to each other continues parallel to the tool parting plane T. According to FIG. 4c the common plane E of the guide rails 4a, 4b arranged parallel to each other encloses a twisting angle $\beta$ with the tool parting plane T.

Figure 5:
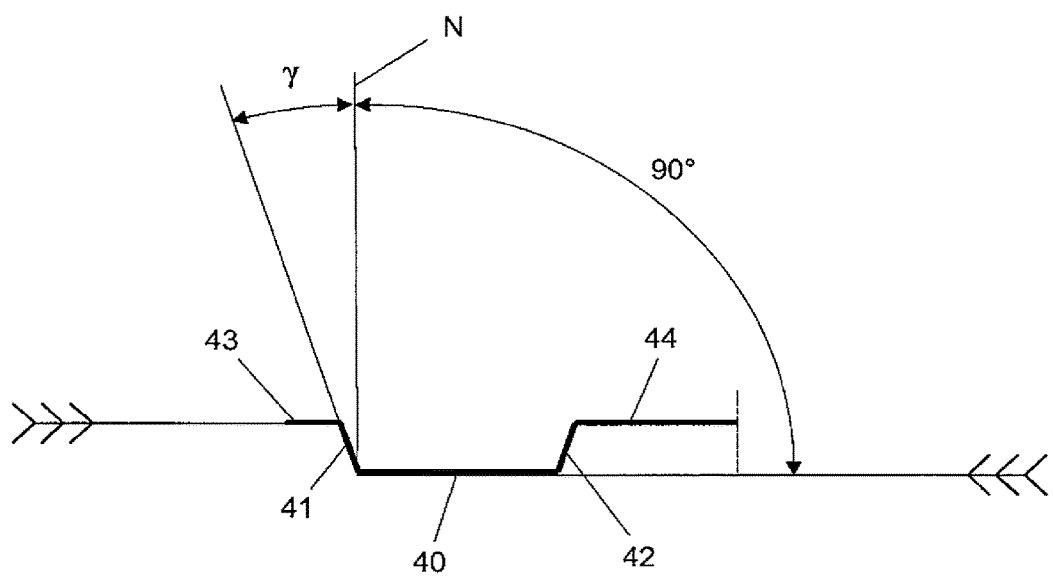
FIG. 5 shows a schematic illustration of a guide profile of a guide rail with guide rails arranged parallel to each other required for the production with a slider-free tool.

The schematic illustration of FIG. 5 shows the requirement for using of a slider-free tool for manufacturing a twisted guide rail or twisted guide rails arranged parallel to each other. Accordingly, the guide leg 41 protruding from the one end of the base 40 and—in case of a symmetrical arrangement—the leg 42 protruding from the other end of the base 40—has to be inclined in respect to the vertical or normal N of the base 40—as provided in case of a guide profile of conventional guide rails—additionally by a profile angle $\gamma$ in respect to the vertical or normal N, wherein the profile angle $\gamma$ of the legs 41, 42 has to be larger or equal the sum of the twisting angles $\alpha$, $\beta$:

$$\gamma \geq \alpha + \beta$$

The above requirement is valid independent whether the guide leg 41 and the leg 42 are inclined at the same profile angle γ in respect to the vertical or normal N of the base 40 or at different profile angles γ, this means also at different inclinations of the guide leg 41 and the leg 42 the above requirement has to be met in order to be able to use a slider-free tool and to guarantee thereby a cost efficient manufacturing of guide rails with short cycle times. Considering the above definition of the minimal profile angle γ the leg 42 can however be inclined as desired, since it is not encompassed by the driver.

Figure 6:
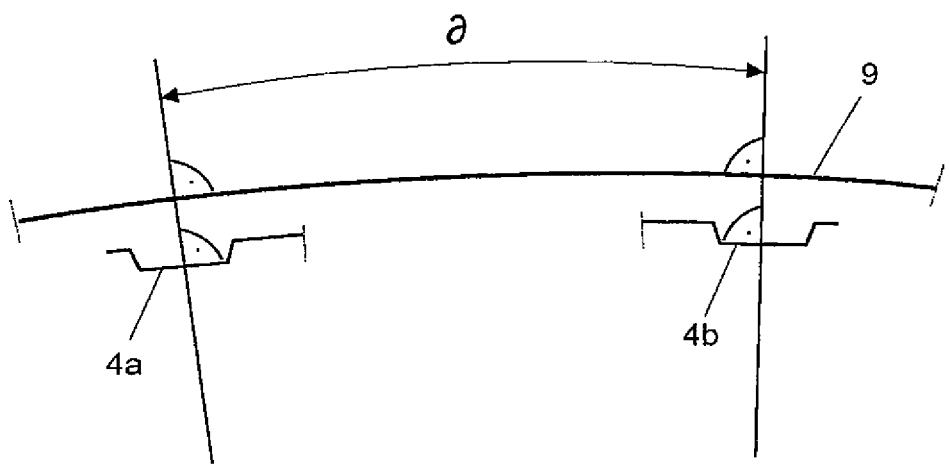
FIG. 6 shows a schematic illustration of two guide rails aligned to the pane area of the arched window pane.

FIG. 6 shows in a schematic cross section the arrangement of guide rails 4a, 4b aligned to the pane area of a window pane 9, the base normal thereof—characterized by a right angle between the base normal and the base as well as the pane surface—enclose an inclination angle δ between it which corresponds to the curvature of the window pane 9.

Figure 7A:
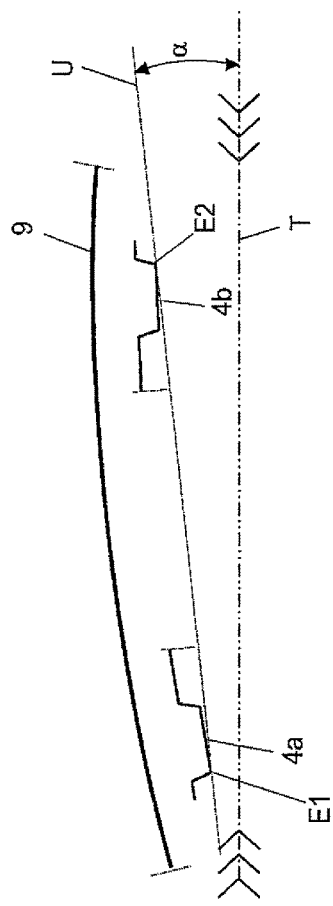
FIG. 7a shows a schematic section of the carrier according to FIG. 2 along the intersecting line A-A with two guide rails aligned to the pane area of an arched window pane.
Figure 7B:
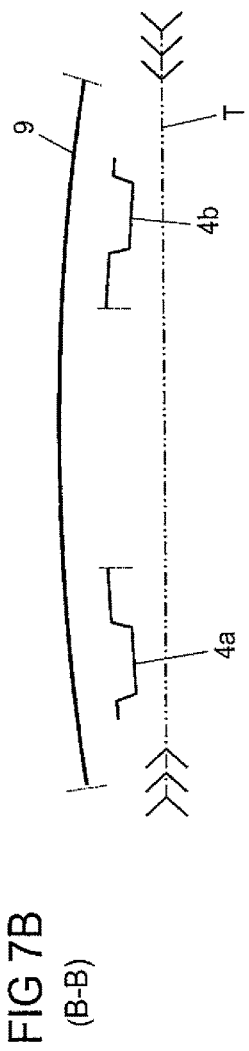
FIG. 7b shows a schematic section of the carrier according to FIG. 2 along the intersecting line B-B with two guide rails aligned to the pane area of an arched window pane.
Figure 7C:
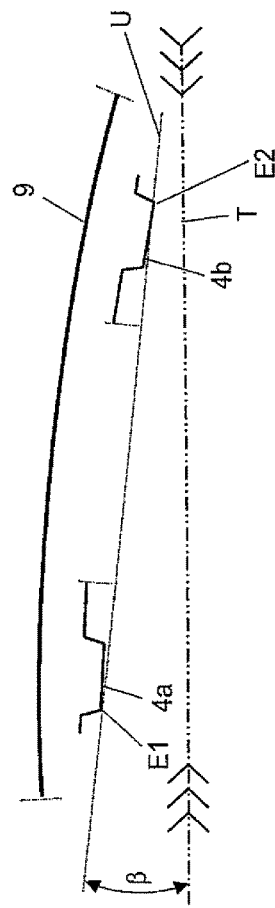
FIG. 7c shows a schematic section of the carrier according to FIG. 2 along the intersecting line C-C with two guide rails aligned to the pane area of an arched window pane.

In FIGS. 7a to 7c sections of the carrier 2 according to FIG. 2 along the intersecting lines A-A, B-B and C-C are illustrated for clarifying the twisting of the guide rails 4a, 4b aligned to the pane area of a window pane 9 and enclosing an inclination angle δ between them. They show how the alignment of the guide rails 4a, 4b twisted along their longitudinal extension (and when installed in the vehicle door about the vehicle vertical axis or Z-axis) changes in respect to the tool parting plane T.

The degree of twisting along the length of the guide rail 4a, 4b is characterized by the twisting angles α and β between the tool parting plane T and an auxiliary line U, on the two ends of the guide rails 4a, 4b, wherein said auxiliary line U is mapped through the intersection E1 of the guide leg 41 with the base 40 of the left guide rail 4a and the intersection E2 of the guide leg 41 with the base 40 of the right guide rail 4b.

According to FIG. 7a the guide rails 4a, 4b enclose a twisting angle α with the tool parting plane T while according to FIG. 4b both guide rails 4 continue at the same angle to the tool parting plane T. According to FIG. 7c the guide rails 4a, 4b enclose a twisting angle β with the tool parting plane T.

Figure 8:
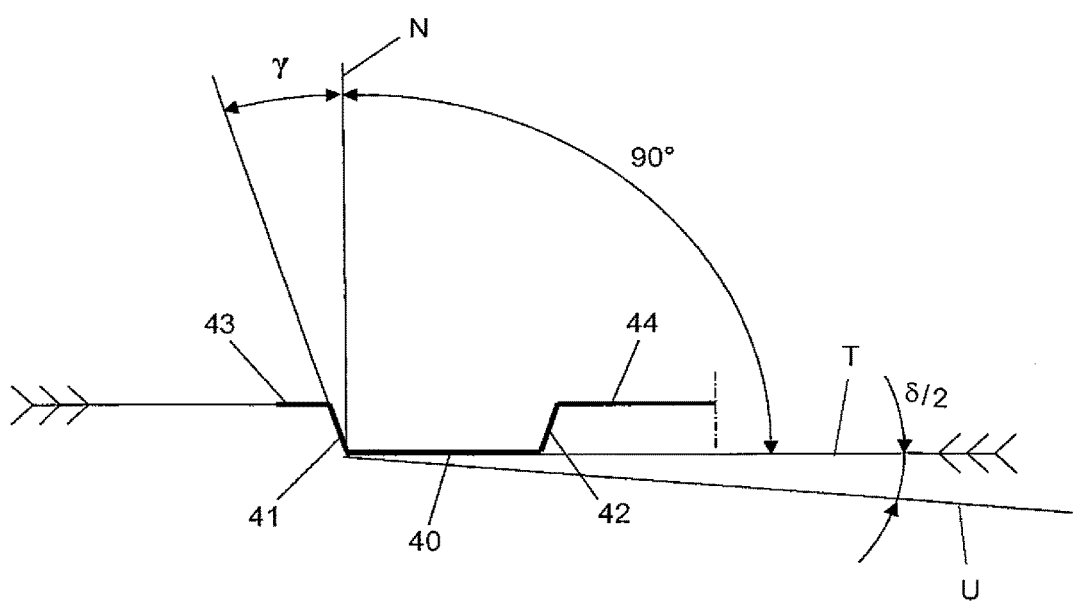
FIG. 8 shows a schematic illustration of a guide profile of a guide rail with guide rails aligned to the pane area of the window pane required for the production with a slider-free tool.

FIG. 8 shows in a schematic graphic illustration the condition for using a slider-free tool for manufacturing twisted guide rails 4a, 4b aligned to the pane area of a window pane 9. Accordingly, the guide leg 41 protruding from the one end of the base 40 and—in case of a symmetrical arrangement—the leg 42 protruding from the other end of the base 40 have to be inclined in respect to the vertical or normal N of the base 40, that means in contrast to conventional guide rails, additionally at a profile angle γ in respect to the vertical or normal N, which is equal or larger the sum of the twisting angles α, β minus half of the inclination angle δ between the tool parting plane T and the auxiliary line U $$\gamma \geq \alpha + \beta - \delta/2$$

Also in case of guide rails 4a, 4b aligned to the pane area the above condition is valid independent of whether the guide leg 41 and the leg 42 are inclined at the same profile angle γ to the vertical or normal N of the base 40 or at different profile angles γ in respect to the normal or vertical N of the base 40.

Figure 9:
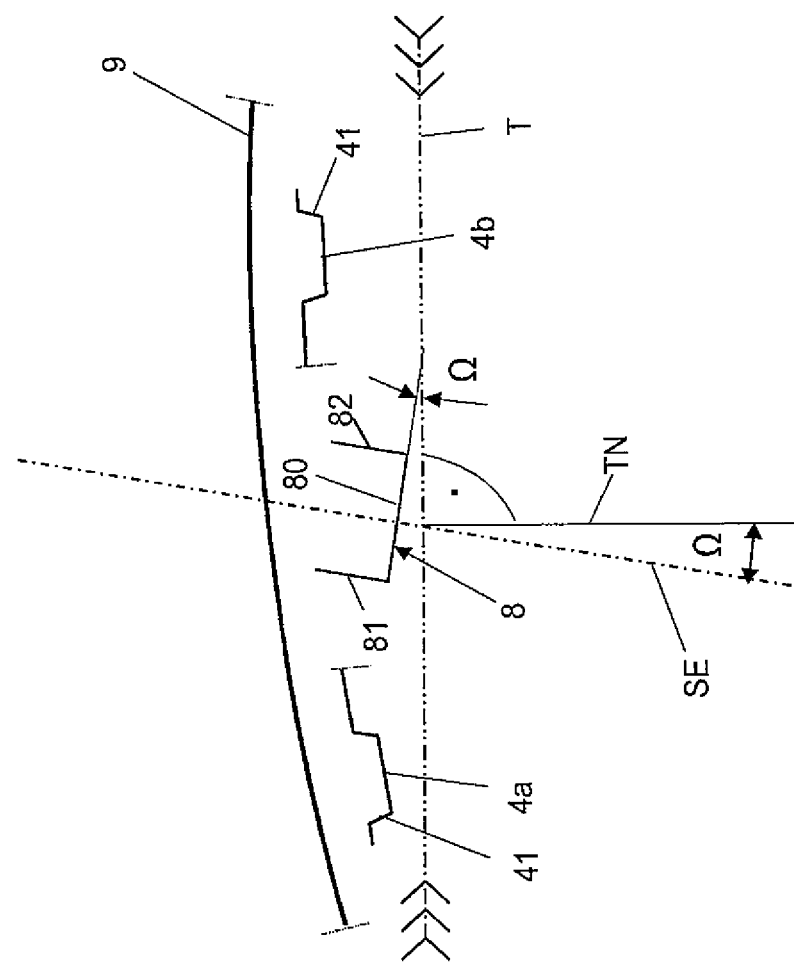
FIG. 9 shows a schematic section of the carrier according to FIG. 2 along the intersecting line B-B with two guide rails aligned to the pane area of an arched window pane and a recess provided in the carrier and inclined in respect to the tool parting plane.

FIG. 9 shows a section of the carrier 2 according to FIG. 2 along the intersecting line B-B having guide rails 4a, 4b aligned to the pane area of a window pane 9 and a recess 8 moulded into the carrier 2 with side walls 81, 82 parallel to each other, wherein said side walls are inclined at an inclination angle Ω to the normal $T_N$ of the tool parting plane T. It can be required for such a recess 8 that the side walls 81, 82 of the recess are aligned vertically to the base 80 of the recess 8, as this is for instance required when forming rope drum housing for receiving a rope drum of a rope window lifter.

In order to use the slider-free on-off tool also in such an arrangement with a retraction direction deviating from the vertical the profile angles γ of the guide leg 41 of the left and right guide rail 4a, 4b have to be adapted to the inclination angle Ω in order to realize a formation of the guide leg 41 and the leg 42 of the left and right guide rail 4a, 4b without using sliders when demoulding the carrier in direction of the dot-dashed illustrated plane SE of the parallel side walls 81, 82 of the recess 8. Due to the demoulding direction deviating from the vertical the profile angles γ have to be determined by considering the inclination angle Ω, wherein the minimal profile angle γ is to be considered when determining the inclination of the guide leg 41 while the opposing leg 42 not encompassed by the driver can be adapted as desired to all conditions by considering the demouldability, however, in practice said leg is usually inclined in the same angle γ in respect to the base 40.

The effect of the inclination angle Ω of the recess 8 in respect to the normal $T_N$ of the tool parting plane T is graphically illustrated in the FIGS. 10a and 10b, which show a cross section of the carrier according to FIG. 2 along the intersecting lines A-A and C-C, that means at the end points of the guide rails with an inclination towards the left in FIG. 10a and an inclination towards the right in FIG. 10b with guide rails 4a, 4b arranged parallel to each other. The following description is valid in analogy also for the guide rails 4a, 4b aligned to the pane area of a window pane 9 according to the illustration of FIG. 9.

The minimal profile angle γ, about which the guide leg 41 has to deviate from the normal N of the base 40 in order to guarantee a demoulding in direction of the dash-dotted illustrated plane SE of the parallel side walls 81, 82 of the recess 8, is derived depending on the inclination of the guide rail 4a or 4b from the determination $$\gamma \geq \alpha + \beta - \delta/2 \pm \Omega,$$

that means the profile angle γ has to be inclined in case of the guide rails 4a, 4b aligned to the pane area of a window pane 9 in respect to the vertical or normal N of the base 40 in an angle which is the same or larger the sum of the twisting angles α, β minus half of the inclination angle δ between the tool parting plane T and the auxiliary line U according to the FIGS. 7a and 7c plus or minus the inclination angle Ω.

In case of guide rails 4a, 4b arranged parallel to each other the criteria $$\gamma \geq \alpha + \beta \pm \Omega$$

is valid for the profile angle γ due to the omission of the inclination angle δ between the tool parting plane T and the auxiliary line U.

Thereby, the two above formulae provide a criteria, that means the leeway, when determining the profile angle γ at which the profile angle γ has to be inclined in respect to the vertical or normal N of the base 40 for guaranteeing a demoulding in direction of a direction deviating from the vertical and inclined about the inclination angle Ω in respect to the vertical.

FIG. 10A shows, when taking as a basis the same profile angles γ for all guide legs 41 in respect to the left guide rail 4a, an inclination of the guide rail 41, which clearly deviates from the plane SE of the parallel side walls 81, 82 of the recess 8 such that when demoulding no problems occur while in case of the right guide rail 4b at an inclination of the guide leg 41 about the profile angle γ in respect to the normal N only a slight deviation from the plane SE of the parallel side walls 81, 82 of the recess 8 is detectable, that means the demoulding is guaranteed but is in a threshold area.

FIG. 10B shows, when taking as a basis the same profile angles γ for all guide legs 41 in respect to the left guide rail 4a due to the tilting of the left guide rail 4a towards the right, an inclination of the guide leg 41, which has approached the plane SE of the parallel side walls 81, 82 of the recess 8, but has still a sufficient distance in order to guarantee a proper demoulding while the inclination of the guide leg 41 of the right guide rail 4b has, due to its tilting towards the right, now a larger deviation from the plane SE of the parallel side walls 81, 82 of the recess 8.

Previously, it was started from the same profile angle γ for all guide legs 41 or legs 41 and 42 and thus from practice-relevant guide profiles. As an alternative overall variable guide profiles, that means profile angles γ deviating from each other, are possible in respect to the actual guide leg 41, along which the drivers slide, as well as in respect to the legs 41 and 42.

The larger/equal requirement when determining the profile angle γ can be used in a manner that different guide properties are assigned to the guide rails 4a, 4b. For instance, the profile angles γ determining the inclination of the guide leg 41 of the right guide rail 4b being important for guiding a driver can be set to zero, that means the guide leg 41 can be aligned parallel to the plane SE of the side walls 81, 82 of the recess 8 in order to guarantee an optimal guidance of the right guide rail 4b in vehicle longitudinal direction that means in direction of the X-axis of the vehicle, while the guide leg 41 of the left guide rail 4a is more inclined in respect to the normal to the base 40 in order to guarantee a safe demoulding.

The invention claimed is:

1. A door system for a vehicle door with a carrier and at least two guide rails of a window lifter for lifting and lowering a window pane along an adjusting travel path integrated into the carrier, wherein each of the two guide rails is arranged on a base plate of the carrier and is configured to guide an adjusting part of the window lifter coupled to the window pane along an adjusting direction predetermined by the at least two guide rails,
wherein each of the at least two guide rails is, at least in sections, twisted or bent and comprises a base as well as a guide leg and a leg which protrude from longitudinal side edges of the base at obtuse draft angles with respect to the base,
wherein a size of the draft angles is proportional to the bending or twisting of the base plate or the respective guide rail predetermined by the adjusting travel path of the window pane,
wherein the at least two guide rails are aligned with the window pane area and the bases of the two guide rails are inclined with respect to each other at an inclination angle δ,
wherein the guide leg and the leg of a respective guide rail protrude from the longitudinal side edges of the base at a profile angle γ in respect to the base normal, wherein said profile angle γ meets the requirement $$\gamma \geq \alpha + \beta - \delta/2$$

and wherein α and β are twisting angles of the guide rails at an upper and lower end of the guide rails with respect to a reference plane tangent to and extending between the bases of the at least two guide rails at a location between the upper and lower ends of the respective guide rail and δ is the inclination angle between the bases of the at least two guide rails.

2. The door system according to claim 1 with a recess for receiving a component of the window lifter moulded into the carrier, wherein the side walls of the recess are inclined at an inclination angle Ω to the normal of the reference plane, wherein the guide leg and the leg of a respective guide rail protrude from the longitudinal side edges of the base at a profile angle γ in respect to the base normal, wherein the profile angle meets the requirement $$\gamma \geq \alpha + \beta - \delta/2 \pm \Omega.$$

3. The door system according to claim 2, wherein the recess is configured for receiving a rope drum.

4. The door system according to claim 1, wherein the profile angles γ of the guide legs of the first and second guide rails differ from each other.

5. The door system according to claim 4, wherein the profile angle γ of the guide leg of at least one guide rail is minimal.

6. A method for producing the carrier and the at least two guide rails of a window lifter arranged on the carrier of a door system according to claim 1, wherein each of the at least two guide rails is an injection molded part being molded by an injection moulding tool containing a separated form which is closed for injecting plastics and which is opened for demoulding the guide rails, wherein said form corresponds to the carrier and a guide profile of the guide rails, is closed under pressure for injecting plastics and is opened for demoulding of the carrier and the guide rails without a slider being guided vertical or at an angle to the opening-closing direction of the injection moulding tool (on-off-tool).

7. A door system for a vehicle door with a carrier and at least two guide rails of a window lifter for lifting and lowering a window pane along an adjusting travel path integrated into the carrier, wherein each of the two guide rails is arranged on a base plate of the carrier and is configured to guide an adjusting part of the window lifter coupled to the window pane along an adjusting direction predetermined by the at least two guide rails,
wherein each of the at least two guide rails is, at least in sections, twisted or bent and comprises a base as well as a guide leg and a leg which protrude from longitudinal side edges of the base at obtuse draft angles with respect to the base,
wherein a size of the draft angles is proportional to the bending or twisting of the base plate or the respective guide rail predetermined by the adjusting travel path of the window pane,
wherein the guide rails are aligned parallel to each other,
wherein the carrier comprises a recess for receiving a component of the window lifter, the recess being formed into the carrier,
wherein the guide leg and the leg of a respective guide rail protrude from the longitudinal side edges of the base at a profile angle γ in respect to the base normal, wherein said profile angle meets the requirement $$\gamma \geq \alpha + \beta \pm \Omega,$$

wherein α and β are the twisting angles of the guide rails at an upper and lower end of the guide rails with respect to a reference plane tangent to and extending between the bases of the at least two guide rails at a location between the upper and lower ends of the respective guide rail and Ω is an inclination angle with which side walls of the recess are inclined to a normal of the reference plane.

8. The door system according to claim 7, wherein the recess is configured for receiving a rope drum.

\* \* \* \* \*